UNITED STATES PATENT OFFICE.

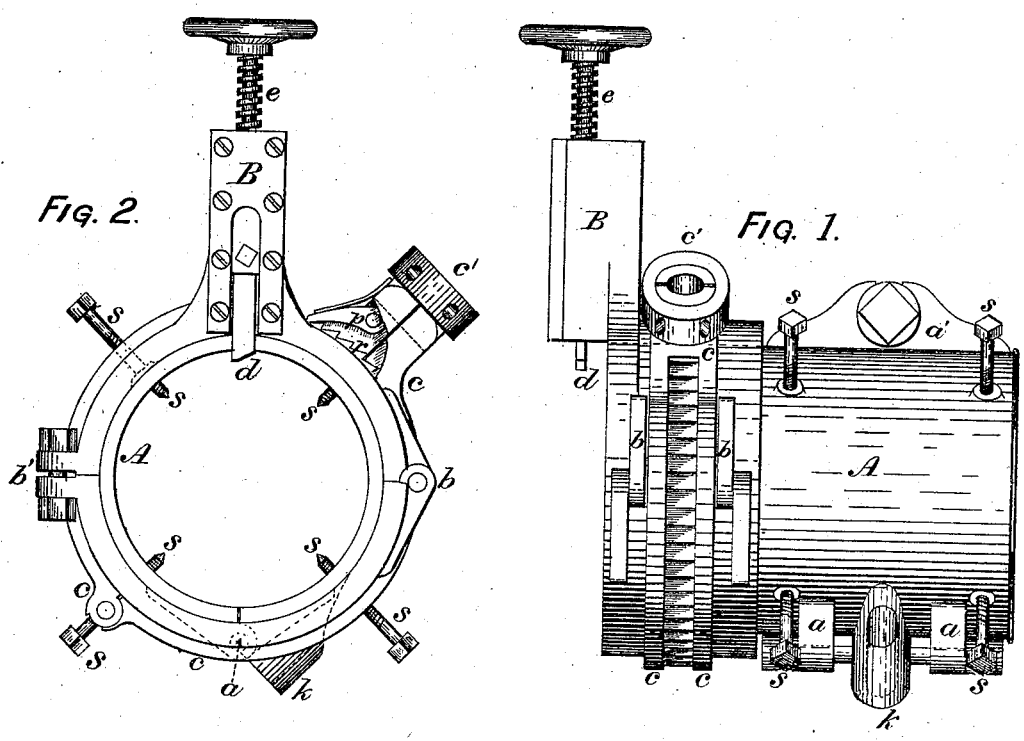

AUSTIN C. WOOD, OF SYRACUSE, NEW YORK.

IMPROVEMENT IN PIPE-CUTTERS.

Specification forming part of Letters Patent No. 177,673, dated May 23, 1876; application filed March 9, 1876.

*To all whom it may concern:*

Be it known that I, AUSTIN C. WOOD, of Syracuse, New York, have invented an Improved Tool for Cutting off Gas and other Pipes of Cast or Wrought Metal, of which the following is a specification:

There has been a great want of a convenient and efficient means of cutting off pipes by engineers in gas and water works, especially where the pipes are laid in the ground. By my invention I have produced a tool that will quickly and perfectly cut off a pipe in any location without danger of splitting or breaking, or otherwise injuring the pipe, as often happens in cutting it off in the old way with a cold-chisel.

The construction is as follows, referring to the accompanying drawing, in which Figure 1 is a side elevation of the apparatus or tool actuated by means of a ratchet-wheel; Fig. 2, a front view at right angles to Fig. 1.

In the several figures, A is a sleeve, made to surround the pipe to be cut. This sleeve is divided longitudinally into two parts, with a hinge or other joint at $a$, and a screw-fastening at $a'$, to keep the two parts of the sleeve together when put around the pipe to be cut. The pipe is centered in the sleeve by means of radial set-screws $s$, which hold the sleeve firmly to the pipe in proper position to cut it, and which are operated independently of the cutter. At one end of the sleeve A a cutter-head, B, is so attached, by a collar, as to revolve around the sleeve. This is also made with its collar divided, with a joint at $b$, and fastened at $b'$. To remove it, a ratchet-wheel, $r$, projects from the collar, the teeth being embraced by rings C, jointed at $c$, and united at a projection fastened by a nut, $c'$, where a socket is formed to introduce a lever to work the ratchet-wheel by a pawl, $p$, that catches into the ratchet, and revolves the cutter-head. This cutter-head B holds a cutter, $d$, that slides inward toward the center by means of a set-screw, $e$. The radial set-screws $s$ center the pipe in the sleeve, and adjust to any size of pipe that is to be taken in. The cutter $d$ is then brought down in contact with the pipe, and cuts as it revolves around it, being gradually projected inward until it cuts the pipe off. To prevent the pipe or sleeve from turning I insert a lever in socket $k$.

Having thus fully described my improved pipe-cutter, I claim—

The combination of the jointed sleeve A, provided with independent centering-screws, jointed collar, and revolving cutter-head, substantially as shown and described.

AUSTIN C. WOOD.

Witnesses:
P. B. McLENNAN,
J. J. GREENOUGH.